United States Patent
You et al.

(10) Patent No.: US 11,172,398 B2
(45) Date of Patent: Nov. 9, 2021

(54) DATA TRANSMISSION CONTROL METHOD AND RELATED PRODUCT

(71) Applicant: GUANGDONG OPPO MOBILE TELECOMMUNICATIONS CORP., LTD., Guangdong (CN)

(72) Inventors: Xin You, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/649,027

(22) PCT Filed: Feb. 6, 2018

(86) PCT No.: PCT/CN2018/075451
§ 371 (c)(1),
(2) Date: Mar. 19, 2020

(87) PCT Pub. No.: WO2019/153124
PCT Pub. Date: Aug. 15, 2019

(65) Prior Publication Data
US 2020/0296618 A1  Sep. 17, 2020

(51) Int. Cl.
*H04W 28/02* (2009.01)
*H04L 12/741* (2013.01)

(52) U.S. Cl.
CPC ......... *H04W 28/0268* (2013.01); *H04L 45/74* (2013.01)

(58) Field of Classification Search
None
See application file for complete search history.

(56) References Cited

U.S. PATENT DOCUMENTS

| 10,601,535 | B2* | 3/2020 | Kim | ............ H04W 76/27 |
| 10,856,168 | B2* | 12/2020 | Kim | ............ H04W 24/10 |
| 10,863,494 | B2* | 12/2020 | Zhang | ............ H04L 5/0048 |
| 10,912,041 | B2* | 2/2021 | Lee | ............ H04W 52/365 |

(Continued)

FOREIGN PATENT DOCUMENTS

| CN | 101179595 A | 5/2008 |
| CN | 101217466 A | 7/2008 |

(Continued)

OTHER PUBLICATIONS

International Search Report in the international application No. PCT/CN2018/075451, dated Oct. 26, 2018.

(Continued)

*Primary Examiner* — Eunsook Choi
(74) *Attorney, Agent, or Firm* — Perkins Coie LLP

(57) ABSTRACT

Disclosed in embodiments of the present application are a data transmission control method and a related product. The method comprises: an SDAP layer entity of a terminal receives an SDAP service data unit (SDU) from an application layer; the SDAP layer entity processes the SDAP SDU to obtain an SDAP protocol data unit (PDU); and the SDAP layer entity sends the SDAP PDU to a lower layer entity. According to a transmission method for an SDAP PDU without carrying RQI, the real-time performance of data processing of an SDAP layer on a terminal side is improved.

6 Claims, 3 Drawing Sheets

(56) References Cited

U.S. PATENT DOCUMENTS

| | | | | |
|---|---|---|---|---|
| 2019/0028920 | A1* | 1/2019 | Pan | H04L 47/24 |
| 2019/0150023 | A1* | 5/2019 | Cho | H04W 28/02 |
| | | | | 370/235 |

FOREIGN PATENT DOCUMENTS

| | | | |
|---|---|---|---|
| CN | 101588231 | A | 11/2009 |
| CN | 101646208 | A | 2/2010 |
| CN | 102111393 | B | 6/2014 |
| CN | 106341368 | A | 1/2017 |
| CN | 107439037 | A | 12/2017 |
| RU | 2471307 | C2 | 12/2012 |
| RU | 2494574 | C2 | 9/2013 |
| RU | 2521482 | C1 | 6/2014 |
| WO | 2008137598 | A1 | 11/2008 |
| WO | 2010075457 | A2 | 7/2010 |
| WO | 2017192164 | A1 | 11/2017 |
| WO | 2018009021 | A1 | 1/2018 |

OTHER PUBLICATIONS

3GPP, Service Data Adaptation Protocol (SDAP) Specification(Release 15), 3GPP TS 37.324 V1.0.0, issued on Sep. 30, 2017, secion 4-6.
Ericsson, SDAP Header Format, 3GPP TSG-RAN WG2 #99bis Tdoc R2-1711237, issued on Oct. 13, 2017, secion 2.
First Office Action of the Chinese application No. 201880003540.1, dated Dec. 13, 2019.
"3rd Generation Partnership Project; Technical Specification Group Radio Access Network; E-UTRA and NR; Service Data Adaptation Protocol (SDAP) specification (Release 15)", 3GPP Standard; Technical Specification 3GPP TS 37.324. 3rd Generation Partnership Project (3GPP), Mobile Competence Centre; 650, Route Des Lucioles; F-06921 Sophia-Antipolis Cedex; France, vol. RAN WG2, No. V1.1.0, 15 (Jan. 15, 2018), pp. 1-15, XP051392662, * Paragraph "4.2 SDAP architecture" *Paragraph "6.3 Parameters"*.
ZTE Corporation et al: "Discussion on SDAP Data PDU for reflective QoS", 3GPP Draft; R2-1710439 Discussion On SDAP Data PDU for Reflective QoS, 3rd Generation Partnership Project (3GPP), Mobile Competence Centre; 650, Route Des Lucioles; F-06921 Sophia-Antipolis Cedex; vol. RAN WG2, No. Prague, Czech Republic; Oct. 9, 2017-Oct. 13, 2017, (Oct. 8, 2017), XP051342484, * Paragraph "2 Discussion"* * Paragraph "4 TP for 37.324"*.
Supplementary European Search Report in the European application No. 18905080.0, dated Nov. 12, 2020.
Ericsson, "RLC header structure", 3GPP TSG-RAN WG2 #59 Tdoc R2-073228 Athens, Greece, Aug. 20-24, 2007.
TSG GERAN, "Reply LS on Transmission Aspects for Speech Enabled Services (SES)", 3GPP TSG-SA WG4 Meeting #25bis Tdoc S4-030114 Berlin, Germany Agenda Items: 4.2, 7; Feb. 24-28, 2003.
"3rd Generation Partnership Project; Technical Specification Group Radio Access Network; Evolved Universal Terrestrial Radio Access (E-UTRA) Radio Link Control (RLC) protocol specification (Release 8)" 3GPP TS 36.322 V2.0.0 (Nov. 2007), http://www.3gpp.org.
Second Office Action of the Chinese application No. 201880003540.1, dated Feb. 26, 2020.
Third Office Action of the Chinese application No. 201880003540.1, dated May 27, 2020.
Notice of Rejection of the Chinese application No. 201880003540.1, dated Aug. 21, 2020.
Written Opinion of the International Search Authority in the international application No. PCT/CN2018/075451, dated Oct. 26, 2018.
Session Chair (InterDigital), Report from LTE and NR User Plane Break-Out Session, Approval, 3GPP TSG-RAN WG2 NR Ad hoc 1801, Jan. 22-Jan. 26, 2018.
First Office Action of the Russian application No. 2020120984, dated Jun. 22, 2021. 11 pages with English translation.
Notice of Re-Examination of the Chinese application No. 201880003540.1, dated Jul. 14, 2021. 9 pages with English translation.
First Office Action of the Canadian application No. 3086722, dated Aug. 5, 2021. 3 pages.

* cited by examiner

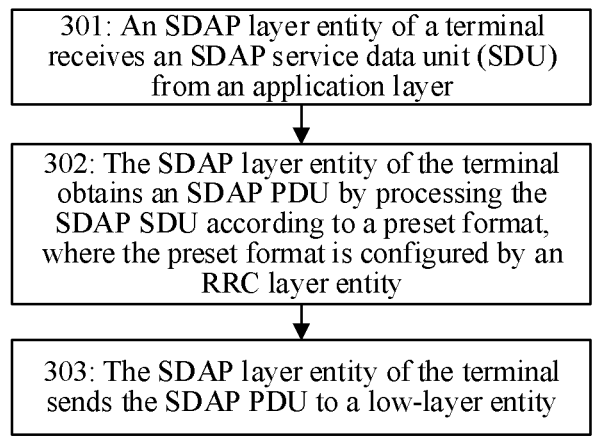
FIG. 2E
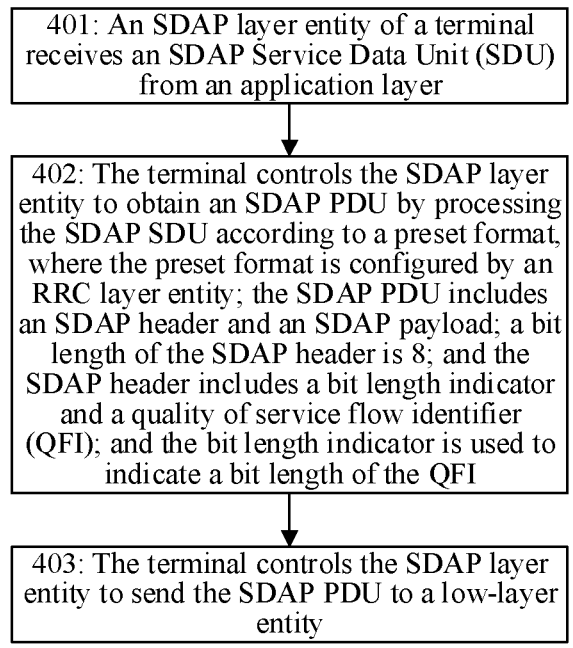
FIG. 3
FIG. 4

DATA TRANSMISSION CONTROL METHOD AND RELATED PRODUCT

CROSS-REFERENCE TO RELATED APPLICATIONS

The present application is a U.S. National Phase Entry of International PCT Application No. PCT/CN2018/075451 filed on Feb. 6, 2018, and entitled "DATA TRANSMISSION CONTROL METHOD AND RELATED PRODUCT", the content of which is hereby incorporated by reference in its entirety.

TECHNICAL FIELD

The present disclosure relates to the field of communication technologies, and in particular, to a data transmission control method and a related product.

BACKGROUND

With the continuous development of wireless and wired technologies, in a New Radio (NR) wireless communication system, a service data adaptation protocol (SDAP) layer is currently introduced into a user plane protocol stack to complete mapping between a quality of service (QoS) flow and a data radio bearer (DRB) and mark a QoS flow identifier (QFI) in an uplink/downlink data packet.

The current conclusion is that, for an access stratum (AS) and a non-Access stratum (NAS), reflective quality of service (QoS) is independently supported, that is, for downlink transmission, an SDAP layer protocol data unit (PDU) needs to carry a reflective QoS Indicator (RQI) of at least one bit. However, for uplink transmission, the SDAP layer PDU may not need to carry an RQI. Currently, there is no uplink transmission control solution for an SDAP PDU.

SUMMARY

Embodiments of the present disclosure provide a data transmission control method and a related product, providing a method of transmitting an SDAP PDU that does not carry an RQI, so as to help improve real-time performance of data processing by an SDAP layer on a terminal side.

According to a first aspect, an embodiment of the present disclosure provides a data transmission control method, applied to a terminal, the terminal includes a service data adaptation protocol (SDAP) layer entity, and the method includes:

receiving, by the SDAP layer entity, an SDAP service data unit (SDU) from an application layer;

obtaining, by the SDAP layer entity, an SDAP protocol data unit (PDU) by processing the SDAP SDU; and sending, by the SDAP layer entity, the SDAP PDU to a low-layer entity.

According to a second aspect, an embodiment of the present disclosure provides a terminal, where the terminal has a function of implementing a terminal behavior in the forgoing method design. The function may be implemented by hardware or may be implemented by corresponding software executed by hardware. The hardware or software includes one or more modules corresponding to the foregoing function. In a possible design, the terminal includes a processor, and the processor is configured to support the terminal in executing the corresponding function in the foregoing method. Further, the terminal may further include a transceiver, where the transceiver is configured to support communication between the terminal and a network device. Further, the terminal may further include a memory, where the memory is configured to be coupled to the processor, and stores program instructions and data that are necessary for the terminal.

According to a third aspect, an embodiment of the present disclosure provides a terminal, including a processor, a memory, a communication interface, and one or more programs, where the one or more programs are stored in the memory and are configured to be executed by the processor, and the program includes instructions for executing actions in any method of the second aspect in the embodiments of the present disclosure.

According to a fourth aspect, an embodiment of the present disclosure provides a computer-readable storage medium, where the computer-readable storage medium stores a computer program for electronic data interchange, and the computer program enables a computer to execute some or all of steps described in any method of the first aspect in the embodiments of the present disclosure.

According to a fifth aspect, an embodiment of the present disclosure provides a computer program product, where the computer program product includes a non-transitory computer-readable storage medium that stores a computer program, and the computer program can be operated to enable a computer to execute some or all of actions described in any method of the first aspect in the embodiments of the present disclosure. The computer program product may be a software installation package.

It can be learned that in the embodiments of the present disclosure, an SDAP entity of a terminal receives an SDAP SDU from an application layer; then the SDAP entity obtains n SDAP PDU by processing the SDAP SDU to and finally, the SDAP entity sends the SDAP PDU to a low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

BRIEF DESCRIPTION OF DRAWINGS

The following briefly describes the accompanying drawings needed for describing embodiments and the prior art.

FIG. 2E illustrates an example diagram of a structure of another SDAP header according to an embodiment of the present disclosure;

FIG. 3 illustrates a schematic flowchart of a data transmission control method according to an embodiment of the present disclosure;

FIG. 4 illustrates a schematic flowchart of a data transmission control method according to an embodiment of the present disclosure;

DETAILED DESCRIPTION

The following describes the technical solutions in the embodiments of the present disclosure with reference to the accompanying drawings.

Figure 1:
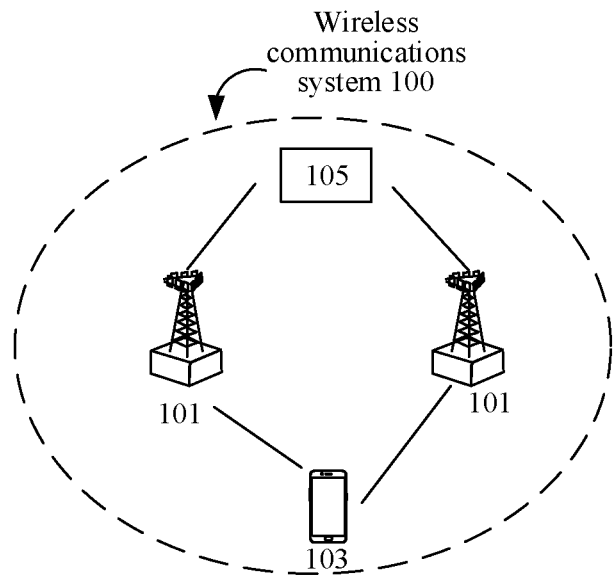
FIG. 1 illustrates a possible network architecture diagram of a communication system according to an embodiment of the present disclosure.

For example, FIG. 1 illustrates a wireless communication system related to the present disclosure. The wireless communication system 100 may operate at a high frequency band, and is not limited to a Long Term Evolution (LTE) system, a future evolved 5th-Generation (5G) system, a New Radio (NR) system, a Machine-to-Machine Communication (M2M) system, or the like. The wireless communication system 100 may include one or more network devices 101, one or more terminals 103, and a core network device 105. The network device 101 may be a base station, and the base station may be configured to communicate with one or more terminals, or may be configured to communicate with one or more base stations having a part of a terminal function (such as a macro base station and a micro base station). The base station may be a Base Transceiver Station (BTS) in a Time Division Synchronous Code Division Multiple Access (TD-SCDMA), an Evolved NodeB (eNB) in an LTE system, or a base station in a 5G system or a New Radio (NR) system. In addition, the base station may alternatively be an access point (AP), a transmission node (Trans TRP), a central unit (CP), or anther network entity, and may include some or all of functions of the foregoing network entities. The core network device 105 includes devices on the core network side, such as an access and mobility management function (AMF) entity, a user plane function (UPF) entity, and a session management function (SMF) entity. The terminals 103 may be distributed in the entire wireless communication system 100, and may be stationary or may be mobile. In some embodiments of the present disclosure, the terminal 103 may be a mobile device (such as a smartphone), a mobile station (mobile station), a mobile unit (mobile unit), an M2M terminal, a wireless unit, a remote unit, a user agent, a mobile client, or the like.

It should be noted that, the wireless communication system 100 illustrated in FIG. 1 is only used to more clearly illustrate the technical solutions of the present disclosure, and does not constitute a limitation to the present disclosure. A person of ordinary skill in the art may understand that, with evolution of network architectures and emergence of a new service scenario, the technical solutions provided in the present disclosure are also applicable to a similar technical problem.

The following describes a related technology in the present disclosure.

Currently, in a 5th-Generation (5G) and New Radio (NR) system, each PDU session at an SDAP layer newly introduced into a user plane protocol stack is corresponding to one SDAP entity, to mainly map data in a QoS flow from an upper layer to a DRB(s) and mark a QoS Flow Identifier (QFI) in uplink/downlink data packets. QFI indicates a QoS flow ID, and is mainly used to identify an ID of a QoS flow. RQI indicates a reflective QoS indicator, and means that mapping a data packet IP to a QoS flow (Non-Access Stratum ((NAS) layer) and mapping the QoS flow to a DRB (Access Stratum (AS) layer) need to be conducted according to a mapping relationship of a downlink packet during transmission of an uplink packet.

The current conclusion is that, for an access stratum (AS) and a non-access stratum ((NAS), quality of service mapping reflective QoS is independently supported, that is, for downlink transmission, an SDAP layer protocol data unit (PDU) needs to carry an RQI of at least one bit. However, for uplink transmission, the SDAP layer PDU may not need to carry an RQI. Currently, there is no uplink transmission control solution for an SDAP PDU.

Based on the foregoing problem, the embodiments of the present disclosure propose the following embodiments, and the following provides detailed description with reference to the accompanying drawings.

Figure 2A:
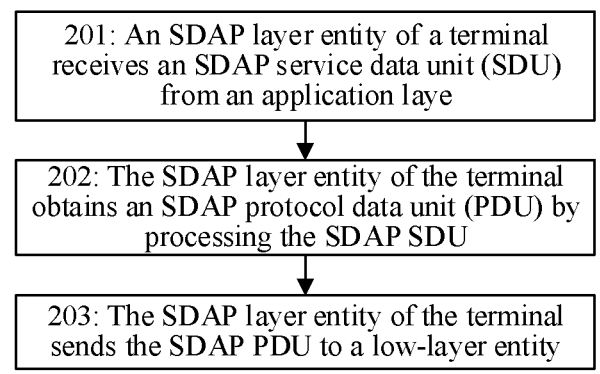
FIG. 2A illustrates a schematic flowchart of a data transmission control method according to an embodiment of the present disclosure.

Referring to FIG. 2A, FIG. 2A illustrates a data transmission control method according to an embodiment of the present disclosure. The data transmission control method is applied to a terminal in the foregoing communication system as an example, and the terminal includes a service data adaptation protocol (SDAP) layer entity; and the method includes the following actions.

In part 201, the SDAP layer entity of the terminal receives an SDAP service data unit (SDU) from an application layer.

The application layer is an application layer of the terminal; a data source of the SDAP SDU may be various data obtained by the application layer of the terminal, for example, user input data detected by the terminal and environmental data collected by the terminal. This is not uniquely limited herein.

In part 202, the SDAP layer entity of the terminal obtains an SDAP protocol data unit (PDU) by processing the SDAP SDU.

In part 203, the SDAP layer entity of the terminal sends the SDAP PDU to a low-layer entity.

It can be learned that in this embodiment of the present disclosure, the SDAP entity of the terminal receives the SDAP service data unit (SDU) from the application layer; then the SDAP entity obtains the SDAP protocol data unit (PDU) by processing the SDAP SDU; and finally, the SDAP entity sends the SDAP PDU to the low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

In a possible example, the operation that the SDAP layer entity obtains an SDAP protocol data unit (PDU) by processing the SDAP SDU includes that, the SDAP layer entity obtains the SDAP PDU by processing the SDAP SDU according to a preset format, where the preset format is configured by an RRC layer entity.

The preset format may be an SDAP header and an SDAP payload. In other words, a reference format for generating the SDAP PDU by using the SDAP SDU may be adding a header, and a specific format of the SDAP header may be determined in advance. This is not uniquely limited herein.

It can be learned that, in this example, because the preset format used to process the SDAP SDU is preconfigured by the RRC layer entity, when receiving the SDAP SDU from the application layer, the SDAP layer entity can obtain the SDAP PDU by processing the SDAP SDU in real time, avoiding a data processing delay, and improving data processing efficiency and consistency.

In a possible example, the SDAP PDU includes an SDAP header and an SDAP payload; a bit length of the SDAP header is 8; and the SDAP header includes reserved R information and a quality of service flow identifier (QFI).

The R information takes a most significant bit of the SDAP header, and a bit length of the QFI is 7; or the R information takes a most significant bit and a secondary most significant bit of the SDAP header, and a bit length of the QFI is 6.

The SDAP payload may include QoS flow data of the terminal (that is, an Internet Protocol (IP) data packet).

Figure 2B:
FIG. 2B illustrates an example diagram of a structure of an SDAP header according to an embodiment of the present disclosure.

For example, as illustrated in FIG. 2B, a bit length of the SDAP header is 8; the SDAP header includes 1-bit R information and a 7-bit QFI, and the R information takes a most significant bit of the SDAP header.

Figure 2C:
FIG. 2C illustrates an example diagram of a structure of another SDAP header according to an embodiment of the present disclosure.

For another example, as illustrated in FIG. 2C, a bit length of the SDAP header is 8; the SDAP header includes 2-bit R information and a 6-bit QFI, and the R information takes a most significant bit and a secondary most significant bit of the SDAP header.

It can be learned that, in this example, the QFI can accurately indicate a correspondence between a current QoS flow and a data radio bearer. Therefore, when a QFI with not less than 6 bits is used, at least 64 correspondences can be indicated, thus improving indication efficiency of the SDAP header in the SDAP PDU, reducing bit consumption and improving utilization.

In a possible example, the SDAP PDU includes an SDAP header and an SDAP payload; a bit length of the SDAP header is 8; the SDAP header includes a bit length indicator and a quality of service flow identifier (QFI); and the bit length indicator is used to indicate a bit length of the QFI.

In a possible example, the bit length of the QFI indicated by the bit length indicator is 6 or 7.

The SDAP payload may include QoS flow data of the terminal.

Figure 2D:
FIG. 2D illustrates an example diagram of a structure of another SDAP header according to an embodiment of the present disclosure.

For example, as illustrated in FIG. 2D, a bit length of the SDAP header is 8; the SDAP header includes a 1-bit bit length indicator and a 7-bit quality of service flow identifier (QFI). A specific value of the 1-bit bit length indicator may be 0 (or 1), and the bit length indicator takes a most significant bit of the SDAP header.

For another example, as illustrated in FIG. 2E, a bit length of the SDAP header is 8; the SDAP header includes a 1-bit bit length indicator, 1-bit R information, and a 6-bit quality of service flow identifier (QFI). A specific value of the 1-bit bit length indicator may be 1 (or 0); the bit length indicator takes a most significant bit of the SDAP header; and the R information takes a secondary most significant bit of the SDAP header.

It can be learned that, in this example, because the bit length indicator can accurately indicate a bit length of a QFI in a current SDAP header, the terminal does not need to conduct scanning detection locally. Therefore, a processing time is reduced, bit length indication efficiency of the QFI is improved, and real-time performance of data processing by the SDAP layer entity is improved.

In specific implementation, for each terminal, a core network device of an NR system (also referred to as 5GC) establishes one or more protocol data unit (PDU) sessions; each PDU session is corresponding to one or more DRBs at an air interface; the one or more DRBs are used to bear data of the PDU session. In the PDU session, a minimum granularity of QoS may be different QoS flows; one PDU session may include multiple QoS flows; and different QoS flows are identified by different QFIs.

In addition, in a PDU session, data in a same QoS flow may be subject to same QoS processing, for example, scheduling. When being sent from the 5GC to an access network device (also referred to as RAN), a QFI may identify each data packet at an N3 interface, and the QFI includes 7 bits. A QFI in a PDU session is unique. The QFI at the N3 interface may be dynamically allocated or may be implicitly equal to a 5QI. There is one-to-one mapping between the 5QI and a 5G QoS characteristic. Because a maximum value of the 5QI is 79, a bit length of a QFI allocated by a core network side to the terminal is at least 7.

On an access network side, the SDAP layer entity marks a QFI for each SDAP PDU (if the QFI is configured, the QFI is the QFI in the SDAP PDU processed by the terminal side and described in this specification); and the QFI is used to identify a mapping relationship between a QoS flow and a DRB. For downlink transmission, to carry an RQI in the SDAP header, the QFI can only be represented by 6 bits; while for uplink transmission, the terminal does not need to carry an RQI, and therefore a bit length of the QFI in the SDAP PDU processed on the terminal side may be 6 or 7. The following provides description of these two cases.

In a possible example, if the bit length of the QFI is 6, the QFI is corresponding to a reference QFI configured by a core network device for the terminal; a bit length of the reference QFI is 7; there is a one-to-one correspondence between a 5G QoS characteristic and a 5G quality of service scale value 5QI indicated by the reference QFI; and the SDAP header includes 1-bit reserved R information.

The 5QI is a 5G QoS Identifier, and is similar to a scale value 5QI in LTE. For each terminal, the 5GC establishes one or more PDU sessions; each PDU session is corresponding to one or more DRBs at an air interface to carry data of the PDU session. In the PDU session, different QoS flows may be distinguished according to minimum granularities of QoS; one PDU session may include multiple QoS flows; and each QoS flow has a corresponding service type, that is, a QoS grade 5QI.

It can be learned that, in this example, in a case in which the bit length of the QFI in the SDAP PDU processed on the terminal side is 6, the QFI can be accurately mapped to the 5QI through the reference QFI, so as to avoid incomplete QoS grade indication due to that the 6-bit QFI cannot indicate all 5QIs, thereby helping more steadily and accurately indicate a 5QI corresponding to a current QFI.

In a possible example, if the bit length of the QFI is 7, the QFI is equal to a 5G quality of service scale value 5QI.

It can be learned that, in this example, in a case in which the bit length of the QFI in the SDAP PDU processed on the terminal side is 7, the 7-bit QFI can directly indicate all QoS grades, and therefore it is not necessary to correlate indirect mapping of the reference QFI, thereby helping improve convenience of QoS grade indication.

Consistent with the embodiment illustrated in FIG. 2A, FIG. 3 illustrates another data transmission control method according to an embodiment of the present disclosure. The data transmission control method is applied to a terminal in the foregoing communication system as an example, and the terminal includes a service data adaptation protocol (SDAP) layer entity; and the method includes the following actions.

In part 301, the SDAP layer entity of the terminal receives an SDAP service data unit (SDU) from an application layer.

In part 302, the SDAP layer entity of the terminal obtains an SDAP PDU by processing the SDAP SDU according to a preset format, where the preset format is configured by an RRC layer entity.

In part 303, the SDAP layer entity of the terminal sends the SDAP PDU to a low-layer entity.

It can be learned that in this embodiment of the present disclosure, the SDAP entity of the terminal receives the SDAP service data unit (SDU) from the application layer; then the SDAP entity obtains the SDAP protocol data unit (PDU) by processing the SDAP SDU; and finally, the SDAP entity sends the SDAP PDU to the low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

In addition, because the preset format used to process the SDAP SDU is preconfigured by the RRC layer entity, when receiving the SDAP SDU from the application layer, the SDAP layer entity can obtain the SDAP PDU by processing the SDAP SDU in real time, avoiding a data processing delay, and improving data processing efficiency and consistency.

Consistent with embodiments of FIG. 2A and FIG. 3, FIG. 4 illustrates a data transmission control method according to an embodiment of the present disclosure. The data transmission control method is applied to a terminal in the foregoing communication system as an example, and the terminal includes a service data adaptation protocol (SDAP) layer entity; and the method includes the following actions.

In part 401, the terminal controls the SDAP layer entity to receive an SDAP service data unit (SDU) from an application layer.

In part 402, the terminal controls the SDAP layer entity to obtain an SDAP PDU by processing the SDAP SDU according to a preset format, where the preset format is configured by an RRC layer entity; the SDAP PDU includes an SDAP packet header and an SDAP payload; a bit length of the SDAP header is 8; and the SDAP header includes a bit length indicator and a quality of service flow identifier (QFI); and the bit length indicator is used to indicate a bit length of the QFI.

In part 403, the terminal controls the SDAP layer entity to send the SDAP PDU to a low-layer entity.

It can be learned that in this embodiment of the present disclosure, the SDAP entity of the terminal receives the SDAP service data unit (SDU) from the application layer; then the SDAP entity obtains the SDAP protocol data unit (PDU) by processing the SDAP SDU; and finally, the SDAP entity sends the SDAP PDU to the low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

In addition, because the preset format used to process the SDAP SDU is preconfigured by the RRC layer entity, when receiving the SDAP SDU from the application layer, the SDAP layer entity can obtain the SDAP PDU by processing the SDAP SDU in real time, avoiding a data processing delay, and improving data processing efficiency and consistency.

In addition, because the bit length indicator can accurately indicate a bit length of a QFI in a current SDAP header, the terminal does not need to conduct scanning detection locally. Therefore, a processing time is reduced, bit length indication efficiency of the QFI is improved, and real-time performance of data processing by the SDAP layer entity is improved.

Figure 5:
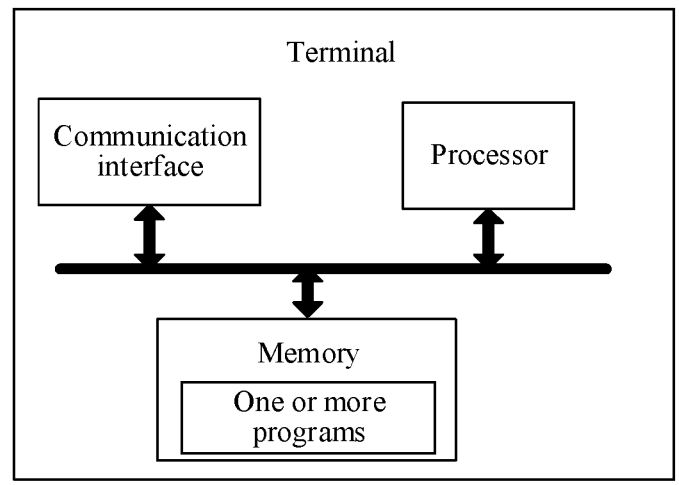
FIG. 5 illustrates a schematic block diagram of a terminal according to an embodiment of the present disclosure.

Consistent with the foregoing embodiment, FIG. 5 illustrates a schematic structural diagram of a terminal according to an embodiment of the present disclosure. As illustrated in the figure, the terminal includes a processor, a memory, a communication interface, and one or more programs, where the one or more programs are stored in the memory and are configured to be executed by the processor, and the program includes an instruction used to conduct the following actions:

controlling an SDAP layer entity to receive an SDAP service data unit (SDU) from an application layer;

controlling the SDAP layer entity to obtain an SDAP protocol data unit (PDU) by processing the SDAP SDU; and controlling the SDAP layer entity to send the SDAP PDU to a low-layer entity.

It can be learned that in this embodiment of the present disclosure, the SDAP entity of the terminal receives the SDAP service data unit (SDU) from the application layer; then the SDAP entity obtains the SDAP protocol data unit (PDU) by processing the SDAP SDU; and finally, the SDAP entity sends the SDAP PDU to the low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

In a possible example, in terms of controlling the SDAP layer entity to obtain an SDAP protocol data unit (PDU) by processing the SDAP SDU, the instructions in the program are specifically configured to execute the following operation: controlling the SDAP layer entity to process the SDAP SDU according to a preset format to obtain the SDAP PDU, where the preset format is configured by an RRC layer entity.

In a possible example, the SDAP PDU includes an SDAP header and an SDAP payload; a bit length of the SDAP header is 8; and the SDAP header includes reserved R information and a quality of service flow identifier (QFI).

The R information takes a most significant bit of the SDAP header, and a bit length of the QFI is 7; or the R information takes a most significant bit and a secondary most significant bit of the SDAP header, and a bit length of the QFI is 6.

In a possible example, the SDAP PDU includes an SDAP header and an SDAP payload; a bit length of the SDAP header is 8; the SDAP header includes a bit length indicator and a quality of service flow identifier (QFI); and the bit length indicator is used to indicate a bit length of the QFI.

In a possible example, the bit length of the QFI indicated by the bit length indicator is 6 or 7.

In a possible example, if the bit length of the QFI is 6, the QFI is corresponding to a reference QFI configured by a core network device for the terminal; a bit length of the reference QFI is 7; there is a one-to-one correspondence between a 5G QoS characteristic and a 5G quality of service scale value 5QI indicated by the reference QFI; and the SDAP header includes 1-bit reserved R information.

In a possible example, if the bit length of the QFI is 7, the QFI is equal to a 5G quality of service scale value 5QI.

The foregoing mainly describes the solutions in the embodiments of the present disclosure from a perspective of interaction between network elements. It can be understood that, to implement the foregoing functions, the terminal and the network device include corresponding hardware structures and/or software modules that implement the functions. A person skilled in the art should be easily aware that, in combination with units and algorithm steps in the examples described in the embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional unit division may be performed on the terminal and the network device according to the foregoing examples. For example, functional unit division may be conducted based on corresponding functions, or two or more functions may be integrated into a processing unit. The integrated unit may be implemented in a form of hardware or may be implemented in a form of a software program module. It should be noted that the unit division in the embodiments of the present disclosure is an example and is merely logical function division, and may be other division in actual implementation.

Figure 6:
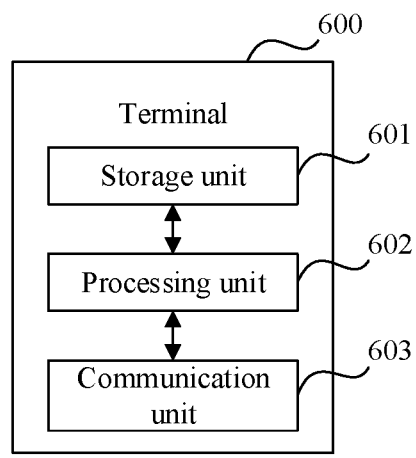
FIG. 6 illustrates a schematic block diagram of a terminal according to an embodiment of the present disclosure.

When integrated units are used, FIG. 6 is a possible block diagram of functional units of the terminal in the foregoing embodiment. The terminal 600 includes a processing unit 602 and a communication unit 603. The processing unit 602 is configured to control and manage actions of the terminal. For example, the processing unit 602 is configured to support the terminal in executing actions 201 to 203 in FIG. 2A, actions 301 to 303 in FIG. 3, actions 401 to 403 in FIG. 4, and other processes in the technology described in the specification. The communication unit 603 is configured to support communication between the terminal and another device, for example, communication between the terminal and the network device illustrated in FIG. 5. The terminal may further include a storage unit 601, configured to store program code and data of the terminal.

The processing unit 602 may be a processor or controller, for example, may be a Central Processing Unit (CPU), a general purpose processor, a Digital Signal Processor (DSP), an Application-Specific Integrated Circuit (ASIC), a Field Programmable Gate Array (FPGA) or another programmable logic device, a transistor logic device, a hardware component, or any combination thereof. The processor or controller may implement or conduct example logical block diagrams, modules, and circuits that are described in content disclosed in the present disclosure. The processor may alternatively be a combination of processors for implementing a computing function, for example, a combination including one or more microprocessors and a combination of the DSP and the microprocessor. The communication unit 603 may be a transceiver, a transceiver circuit, or the like, and the storage unit 601 may be a memory.

The processing unit 602 is configured to control the SDAP layer entity to receive, through the communication unit 603, an SDAP service data unit (SDU) from an application layer; control the SDAP layer entity to obtain an SDAP protocol data unit (PDU) by processing the SDAP SDU; and control the SDAP layer entity to send, through the communication unit 603, the SDAP PDU to a low-layer entity.

It can be learned that in this embodiment of the disclosure, the SDAP entity of the terminal receives the SDAP service data unit (SDU) from the application layer; then the SDAP entity obtains the SDAP protocol data unit (PDU) by processing the SDAP SDU; and finally, the SDAP entity sends the SDAP PDU to the low-layer entity. It can be learned that the SDAP layer entity of the terminal may obtain the SDAP PDU by processing in real time the received SDAP SDU, and sends the SDAP PDU to a low layer, so that the low-layer entity continues to process the data packet. This helps improve real-time performance of data processing by an SDAP layer on a terminal side.

In a possible example, in terms of controlling the SDAP layer entity to obtain an SDAP protocol data unit (PDU) by processing the SDAP SDU, the processing unit 602 is specifically configured to control the SDAP layer entity to obtain the SDAP PDU by processing the SDAP SDU according to a preset format, where the preset format is configured by an RRC layer entity.

In a possible example, the SDAP PDU includes an SDAP header and an SDAP payload; a bit length of the SDAP header is 8; and the SDAP header includes reserved R information and a quality of service flow identifier (QFI). The R information takes a most significant bit of the SDAP header, and a bit length of the QFI is 7; or the R information takes a most significant bit and a secondary most significant bit of the SDAP header, and a bit length of the QFI is 6.

In a possible example, the SDAP PDU includes an SDAP header and an SDAP payload; a bit length of the SDAP header is 8; the SDAP header includes a bit length indicator and a quality of service flow identifier (QFI); and the bit length indicator is used to indicate a bit length of the QFI.

In a possible example, the bit length of the QFI indicated by the bit length indicator is 6 or 7.

In a possible example, if the bit length of the QFI is 6, the QFI is corresponding to a reference QFI configured by a core network device for the terminal; a bit length of the reference QFI is 7; there is a one-to-one correspondence between a 5G QoS characteristic and a 5G quality of service scale value 5QI indicated by the reference QFI; and the SDAP header includes 1-bit reserved R information.

In a possible example, if the bit length of the QFI is 7, the QFI is equal to a 5G quality of service scale value 5QI.

When the processing unit 602 is a processor, the communication unit 603 is a communication interface, and the storage unit 601 is a memory, the terminal in the embodiments of the present disclosure may be the terminal illustrated in FIG. 6.

An embodiment of the present disclosure further provides a computer-readable storage medium, where the computer-readable storage medium stores a computer program for electronic data interchange, and the computer program enables a computer to execute some or all of described actions executed by the terminal in the foregoing method embodiment.

An embodiment of the present disclosure further provides a computer-readable storage medium, where the computer-readable storage medium stores a computer program for electronic data interchange, and the computer program enables a computer to execute some or all of described actions executed by the network device in the foregoing method embodiment.

An embodiment of the present disclosure further provides a computer program product, where the computer program product includes a non-transitory computer-readable storage medium that stores a computer program, and the computer program can be operated to enable a computer to conduct some or all of described steps executed by the terminal in the foregoing method embodiment. The computer program product may be a software installation package.

An embodiment of the present disclosure further provides a computer program product, where the computer program product includes a non-transitory computer-readable storage medium that stores a computer program, and the computer program can be operated to enable a computer to conduct some or all of described steps conducted by the network device in the foregoing method. The computer program product may be a software installation package.

Method or algorithm steps described in the embodiments of the present disclosure may be implemented in a form of hardware, or may be implemented by a processor by executing a software instruction. The software instruction may be formed by a corresponding software module; the software module may be stored in a Random Access Memory (RAM), a flash memory, a Read Only Memory (ROM), an Erasable Programmable ROM (EPROM), an Electrically EPROM (EEPROM), a register, a hard disk, a removable hard disk, a Compact Disc Read-Only Memory (CD-ROM), or a storage medium of any other form that is well known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in an access network device, a target network device, or a core network device. Certainly, the processor and the storage medium may also be located in the access network device, the target network device, or the core network device as discrete components.

A person skilled in the art should be aware that in the foregoing one or more examples, the functions described in the embodiments of in the present disclosure may be implemented completely or partially by using software, hardware, firmware, or any combination thereof. When software is used to implement the functions, these functions may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a Digital Subscriber Line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Video Disc (DVD), a semiconductor medium (for example, a Solid State Disk (SSD)), or the like.

The objectives, technical solutions, and beneficial effects of the embodiments of the present disclosure are further described in detail in the foregoing specific implementations. It should be understood that the foregoing descriptions are merely specific implementations of the embodiments of the present disclosure, but are not intended to limit the protection scope of the embodiments of the present disclosure. Any modification, equivalent replacement, improvement, or the like made based on the technical solutions in the embodiments of the disclosure shall fall within the protection scope of the embodiments of the present disclosure.

The invention claimed is:

1. A data transmission control method, applied to a terminal, wherein the terminal comprises a service data adaptation protocol (SDAP) layer entity, and the method comprises:
   receiving, by the SDAP layer entity, an SDAP service data unit (SDU) from an application layer;
   obtaining, by the SDAP layer entity, an SDAP protocol data unit (PDU) by processing the SDAP SDU; and
   sending, by the SDAP layer entity, the SDAP PDU to a low-layer entity,
   wherein the SDAP PDU comprises an SDAP header and an SDAP payload; a bit length of the SDAP header is 8; the SDAP header comprises a bit length indicator and a quality of service flow identifier (QFI); and the bit length indicator is used to indicate a bit length of the QFI; and
   wherein the bit length of the QFI is 6, the QFI is corresponding to a reference QFI configured by a core network device for the terminal; a bit length of the reference QFI is 7; a 5G QoS characteristic and a 5G quality of service scale value 5QI indicated by the reference QFI have a one-to-one correspondence; and the SDAP header comprises 1-bit reserved R information.

2. The method of claim 1, wherein the obtaining, by the SDAP layer entity, the SDAP PDU by processing the SDAP SDU comprises:
   obtaining, by the SDAP layer entity, the SDAP PDU by processing the SDAP SDU according to a preset format, wherein the preset format is configured by a radio resource control (RRC) layer entity.

3. A terminal, wherein the terminal comprises a memory storing a service data adaptation protocol (SDAP) layer entity, and the terminal further comprises a processor and a communication interface, wherein
   the processor is configured to control the SDAP layer entity to receive, through the communication interface, an SDAP service data unit (SDU) from an application layer; control the SDAP layer entity to obtain an SDAP protocol data unit (PDU) by processing the SDAP SDU; and control the SDAP layer entity to send, through the communication interface, the SDAP PDU to a low-layer entity,
   wherein the SDAP PDU comprises an SDAP header and an SDAP payload; a bit length of the SDAP header is 8; the SDAP header comprises a bit length indicator and a quality of service flow identifier (QFI); and the bit length indicator is used to indicate a bit length of the QFI; and
   wherein the bit length of the QFI is 6, the QFI is corresponding to a reference QFI configured by a core network device for the terminal; a bit length of the reference QFI is 7; a 5G QoS characteristic and a 5G quality of service scale value 5QI indicated by the reference QFI have a one-to-one correspondence; and the SDAP header comprises 1-bit reserved R information.

4. The terminal of claim 3, wherein in terms of controlling the SDAP layer entity to obtain an SDAP protocol data unit (PDU) by processing the SDAP SDU, the processor is configured to control the SDAP layer entity to obtain the SDAP PDU by processing the SDAP SDU according to a preset format, wherein the preset format is configured by an RRC layer entity.

5. A non-transitory computer-readable storage medium, wherein the non-transitory computer-readable storage medium stores a computer program for electronic data interchange, and the computer program enables a terminal to perform a method, comprising:

receiving, by an SDAP layer entity of the terminal, an SDAP service data unit (SDU) from an application layer;

obtaining, by the SDAP layer entity, an SDAP protocol data unit (PDU) by processing the SDAP SDU; and sending, by the SDAP layer entity, the SDAP PDU to a low-layer entity, wherein the SDAP PDU comprises an SDAP header and an SDAP payload; a bit length of the SDAP header is 8; the SDAP header comprises a bit length indicator and a quality of service flow identifier (QFI); and the bit length indicator is used to indicate a bit length of the QFI; and wherein the bit length of the QFI is 6, the QFI is corresponding to a reference QFI configured by a core network device for the terminal; a bit length of the reference QFI is 7; a 5G QoS characteristic and a 5G quality of service scale value 5QI indicated by the reference QFI have a one-to-one correspondence; and the SDAP header comprises 1-bit reserved R information.

6. The non-transitory computer-readable storage medium of claim 5, wherein the obtaining, by the SDAP layer entity, the SDAP PDU by processing the SDAP SDU comprises:

obtaining, by the SDAP layer entity, the SDAP PDU by processing the SDAP SDU according to a preset format, wherein the preset format is configured by a radio resource control (RRC) layer entity.

\* \* \* \* \*